(12) United States Patent
Nakhjiri (10) Patent No.: US 9,027,101 B2
(45) Date of Patent: May 5, 2015

(54) PROVIDING SUBSCRIBER CONSENT IN AN OPERATOR EXCHANGE

(75) Inventor: Madjid F. Nakhjiri, San Diego, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 34 days.

(21) Appl. No.: 13/410,258

(22) Filed: Mar. 1, 2012

(65) Prior Publication Data

US 2012/0227097 A1 Sep. 6, 2012

Related U.S. Application Data

(60) Provisional application No. 61/447,768, filed on Mar. 1, 2011.

(51) Int. Cl.
| | | |
|---|---|---|
| *H04L 9/32* | (2006.01) | |
| *G06F 21/00* | (2013.01) | |
| *H04L 29/06* | (2006.01) | |
| *G06F 21/42* | (2013.01) | |

(52) U.S. Cl.
CPC .............. *H04L 63/08* (2013.01); *G06F 21/42* (2013.01); *H04L 63/10* (2013.01)

(58) Field of Classification Search
None
See application file for complete search history.

(56) References Cited

U.S. PATENT DOCUMENTS

| | | | | |
|---|---|---|---|---|
| 6,505,051 | B1 * | 1/2003 | Alperovich et al. | 455/466 |
| 7,221,749 | B2 * | 5/2007 | Chiczewski et al. | 379/201.01 |
| 8,219,405 | B1 * | 7/2012 | McIntosh | 704/273 |
| 2002/0111809 | A1 * | 8/2002 | McIntosh | 704/273 |
| 2005/0085218 | A1 * | 4/2005 | Clayton | 455/411 |
| 2006/0026042 | A1 | 2/2006 | Awaraji | |
| 2007/0184819 | A1 * | 8/2007 | Barriga-Caceres et al. | 455/411 |
| 2009/0129386 | A1 * | 5/2009 | Rune | 370/392 |
| 2009/0300744 | A1 * | 12/2009 | Guo et al. | 726/7 |
| 2010/0299734 | A1 * | 11/2010 | Lynch et al. | 726/6 |
| 2011/0213969 | A1 * | 9/2011 | Nakhjiri et al. | 713/158 |
| 2012/0079569 | A1 * | 3/2012 | Mendelovich et al. | 726/5 |

FOREIGN PATENT DOCUMENTS

| | | |
|---|---|---|
| WO | 2006/061326 A1 | 6/2006 |
| WO | 2008/014554 A1 | 2/2008 |
| WO | WO 2009095295 A1 * | 8/2009 |

OTHER PUBLICATIONS

PCT Search Report and Written Opinion, Re: Application #PCT/US2012/027353; May 23, 2012.

* cited by examiner

*Primary Examiner* — Andrew Nalven
*Assistant Examiner* — Christopher Ruprecht
(74) *Attorney, Agent, or Firm* — Fox Rothschild LLP (57) ABSTRACT

A method and system for providing a record of consent in scenarios in which the user and a device may have to perform a function that involves two entities that don't trust each other or are not necessary interested in cooperating. In one such example, a user wants to switch services from an "old" operator to a "new" operator. An operator switch without explicit user consent may have legal or business ramifications for both the "old" and "new" operators. The ramifications are even more severe if the switch is the result of actions of, for example, a hacker maliciously causing this switches in order to cause monetary or other damage to either operators or denial of service to the users. In such cases it is useful for both operators to be on record and have an archive of proof of user consent should future disputes arise.

18 Claims, 8 Drawing Sheets

PROVIDING SUBSCRIBER CONSENT IN AN OPERATOR EXCHANGE

CROSS REFERENCE TO RELATED APPLICATIONS

The present application claims the benefit of priority to U.S. Provisional Patent Application Ser. No. 61/447,768, filed on Mar. 1, 2011, entitled "Providing Subscriber Consent in a Operator Exchange," by Madjid R. Nakhjiri, which is hereby incorporated by reference in its entirety.

TECHNICAL FIELD

The present invention relates generally to connectivity services and, more particularly, to methods and systems for providing connectivity services to a population of machine-to-machine (M2M) devices.

BACKGROUND

There are many scenarios where, the use of device credentials alone is not sufficient; a human user is required to provide consent to allow the system to create anti-repudiation mechanisms to track or authenticate customers.

The most straightforward solution for an operator, for example, a service provider switch, is that a user would register with "new" operator using a PC and performing a subscriber authentication through a secure HTTP web interface (using SSL or TLS) and then do the same with the "old" operator. The issue is that this process is not only time consuming and cumbersome, but also does not provide any proof for archiving for future use, by itself, and if the two operators don't trust each other, they won't trust each other's authentication. Further, without device-subscriber binding, it is not clear if the subscriber uses the same device identifier for both of the processes. So a malicious subscriber could provide consent to switch device 1 while interacting with "new" operator, while providing a device 2 identifier when interacting with "old" operator and this way cause a denial of service for device 2 (that could belong to another user). Further, weaker devices may not be able to handle TLS or SSL stacks or other processor-heavy requirement.

There are authentication protocols such as PEAP, EAP-FAST that provide separate user and device authentication profile but they don't provide any evidence that can be passed to third parties.

SAML is a process used for providing assertion of user authentication, but SAML is not issued for a large population of devices. Further, the small M2M devices may lack the capability to support SAML tokens.

Kerberos is another 3 party authentication/authorization mechanism. However, in Kerberos typically the authentication server is a trusted third party that provides the source of trust behind issuing service tickets. Thus neither can act as a source of trust. Kerberos may be used to solve the user consent problem in operator switch. In such a scenario, the subscription manager would need to act as the Kerberos authentication server. The subscription manager must perform prior authentication of subscriber and issuance of a ticket granting ticket first. When subscriber needs to interact with each of the operator, it then has to go to the authentication server and to the ticket granting server and ask for specific tickets for use with each operator. Those tickets are typically encrypted using a symmetric key shared between Kerberos ticket granting server and other servers. This not only means several rounds of interactions, but also requires that symmetric keys be established between the ticket granting server (subscription manger) and those servers (operator) and thus complicates the solution.

Essentially the problem is that in order for an operator change to happen, three parties need to be in agreement: the subscriber, the "old" operator and the "new" operator. Both the "new" and "old" operator need to make sure that the user has provided consent to the move, potentially without trusting each other. Thus, authentication of a user by one of the "old" or "new" operators may not provide enough evidence to satisfy the other operator that the user has provided consent. Thus, both operators must independently ascertain that the user has provided consent. The subscriber credential used in the process may be a password or a PIN or anything that is accessible to a human user. For simplicity we use the term subscriber password (SPW) going forward.

SUMMARY

One implementation includes a method including receiving via an authenticating server, a request for a record of user consent for an action for a first device, challenging, via the authenticating server, the user to provide consent for the action by providing an authentication credential for at least one of a third party and an operator from which, the authentication server did not receive the request, providing, via a second communication device, the requested authentication credential and an identifier of the first device, creating a response, via the second device, using the information from the challenge from the authentication server, information provided by the user, and the second device's credentials, sending the response to the authentication server, verifying the response and issuing a token recording user consent; and sending the record of user consent to the requesting entity, wherein the third party obtains records of user consent regarding a switch from a first service provider to a second service provider for services provided to at least the first device. The authenticating server may belong to a third party. The request can be a trigger from at least one of the first operator the second operator, and the user. The trigger can includes information that assists the authentication server with locating information on at least one of user's subscription information and corresponding device information, where the subscription information pertains to at least one of the first and second operator. The authentication server can provide at least one of integrity protection, confidentiality protection and anti-replay protection measures to the challenge issued to user.

In one implementation, the confidentiality protection uses second device's credentials. The authentication server can include at least one of the identifier of at least one first device, the identifier of at least one of the operators, and the identifier of user's subscription with at least one of the operators in the challenge. At least one of the user and the second device can include at least one of the above-stated parameters to its response to the challenge. The authentication server can send the user's response to the challenge to at least one of operators, and a third party, for verification. The token issued by the authentication server can include at least one of the first operator ID, second operator ID, the user's subscription information with at least one of the first and second operator, the corresponding first device identifier, time of user consent, time of token signing, server's signature on the token, and server's certificate.

In one implementation, the identifier of the first device provided by the user refers to a list of several device identifiers, so that the consent provided by the user pertains to all devices included on the list. The identifier of the first device provided by the user can explicitly includes a list of several device identifiers. The second device credentials can be provided by the third party. The first and second device can be the same device. The record of user consent can be used to trigger the second operator provisioning of credentials for enabling service to the user. The authenticating server can belong to the third party and sends the record of user consent to both first and second operators.

One implementation includes a method for a service provider obtaining records of user consent regarding a switch from a first service provider to a second service provider for services provided to at least one first device, comprising a referring service provider, being one of the first and second service provider, receiving a request for service provider change pertaining to at least one first device from a user, the referring service provider sending a request for a record of user consent regarding the switch of service for the said first device to the other referred service provider, involved in the switch, an authenticating server, belonging to referred service provider, challenging the said user to provide consent for the switch, using a communication system, authentication credential for the referred provider, the user using a second communicating device to provide the requested authentication credential and the identifier of the said first device, the second device, creating a response, using the information from challenge from the said authentication server, information provided by the said user and the second device's credentials, and sending the response to the said authentication server, the authentication server verifying the response and issuing a record of user consent using cryptographic means, and sending to the record of user consent to the referring service provider.

BRIEF DESCRIPTION OF THE DRAWINGS

Various implementations of the present invention will be described below in more detail, with reference to the accompanying drawings.

It is to be noted, however, that the appended drawings illustrate implementations of this invention and are therefore not to be considered limiting of its scope, for the invention may admit to other equally effective implementations.

DETAILED DESCRIPTION

An example of a system in which an implementation of the invention may be used will now be described. It is understood that elements depicted as function blocks in the figures may be implemented as hardware, software, or a combination thereof. Furthermore, implementations of the invention may also be employed on other systems, such as on a personal computer, smart phone or tablet computer.

A list of acronyms used in this application are as follows: "new" operator (On), "old" operator (Oo), "new" operator ID (OIDn), "old" operator ID (OIDo), SM ID (OIDsm) subscriber's ID and password for the "new" operator (SIDn, SPWn), subscriber's ID and password for the "old" operator (SIDo, SPWo), subscriber ID and password for the SM (SIDsm, SPWsm), device ID (DiD), device_ID_list (DIL), Server public key and private key (S_PLK, S_PVK), server certificate (S_Cert), Server signature (S_Sig), device public and private key (D_PLK, S_PVK), device signature (D_sig), subscription manager (SM), token public and private key (T_PLK, T_PVK), device symmetric key (D_SYM), User Consent Token (UCT).

There are many scenarios in which the use of device credentials alone is not sufficient to perform a transaction or task, and a human user is required to provide or verify consent to allow the system to create anti-repudiation mechanisms to track customers. Some implementations follow in the text below.

In a typical scenario, a user must accept financial responsibility regarding a purchase or consumption of sensitive material such as valuable video content, before the device is provided with decryption keys to access the content. Applicability of solutions which bind a user and device credentials and identity to map a paying user to a device receiving content decryption keys are limited in the sense that the solution is a rather complex suited for a device with an ample processing power and secure platform capable of performing the complicated stacks and cryptographic functions of TLS and EAP and storing intermediary keys. In other scenarios, the devices are inexpensive and/or cheaply made or sold and thus require less complex solutions. In yet another scenario, a user has a need to manage a large population of devices (that may also be rather inexpensive and incapable when it comes to cryptography). In the latter case, it is desirable to have a mechanism to allow the user to perform approval (consent) regarding operations that pertain to a large population of devices without performing the operations for each device individually.

There are scenarios in which the user and device may have to perform a function that involves two entities that don't trust each other or are not necessary interested in cooperating. In one such example, a user wants to switch services from an "old" operator to a "new" operator. An operator switch without explicit user consent may have legal or business ramifications for both the "old" and "new" operators. The ramifications are even more severe if the switch is the result of actions of, for example, a hacker maliciously causing this switches in order to cause monetary or other damage to either operators or denial of service to the users. In such cases it is useful for both operators to be on record and have an archive of proof of user consent should future disputes arise.

Obtaining consents in a serial fashion can be time-consuming and cumbersome, not to mention the follow-up configuration that is required as a result of the switch. Thus, it is useful to obtain the consent from both operators as part of a single process. However, in many cases requiring both network entities from different operators to engage in exchanges may simply not be possible due to firewall and other security configuration and trust issues and it may be desired to use a third party as a mediator.

Figure 1A:
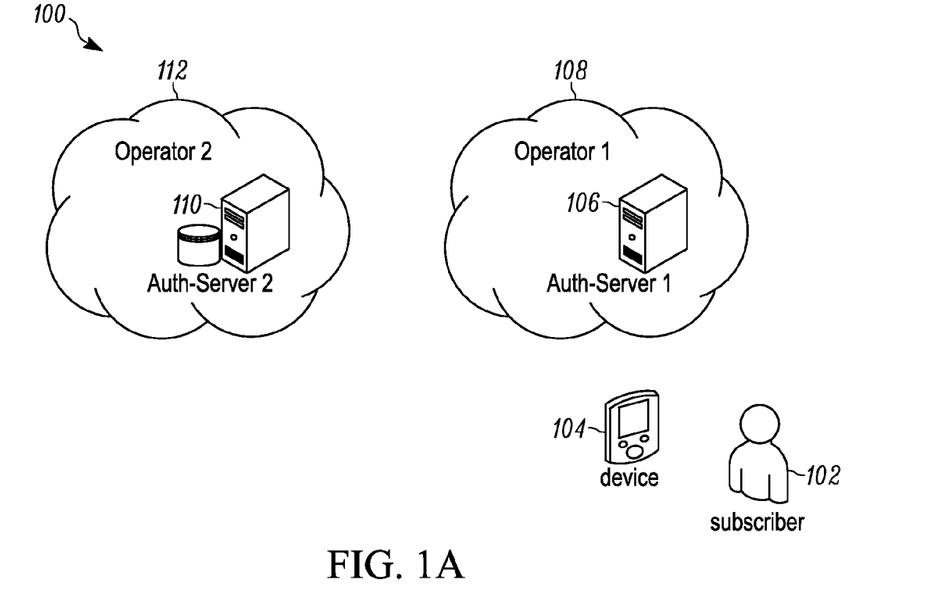
FIGS. 1A and 1B show examples of an operating environment in which the authentication processes described herein may be implemented.
Figure 1B:
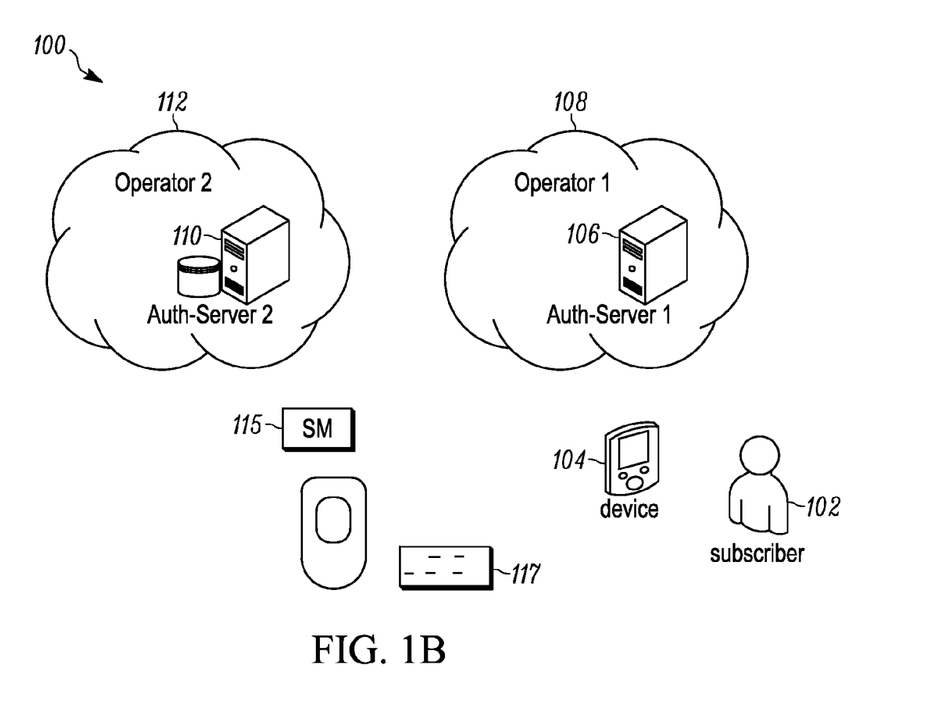

FIGS. 1A and 1B depict a system overview of a system 100 in which an implementation of the invention may be used. A subscriber 102, a device 104, an operator 1 108 including authentication server 1 106 and an operator 2 112 including authentication server 2 110 are depicted in FIGS. 1A and 1B. FIG. 1B also shows optional service manager 115 and an optional second device 117.

For purposes of this application the server 1 and server 2 can also be referred to as the "old" operator/server and the "new" operator/server. Either authentication server 1 106 or authentication server 2 110 can be the "old" (e.g. existing) server or the "new" (e.g. target) server, and can be interchanged as per any of the disclosed implementations. For purposes of this application, the term "old" operator/server can refer to, for example, a user's existing service provider, and the term "new" operator/server can refer to the intended new service provider, or the service provider to which the user intends to transfer service. Both server elements 106 and 110 can be used to refer to either type or circumstance, as per any of the included implementations.

FIGS. 1A and 1B show examples of an operating environment in which the authentication processes described herein may be implemented. In one implantation, authentication can refer to both authentication of a device 104 and authorization of a user 102. Authentication servers 106 and 110, for example at service providers, perform authentication functions, After performing the authentication process described below, an "old" server can provide evidence of the actions which were performed to a "new" server. In this way the server 106, 110 can in turn perform its function (e.g., delivering a service) based on the assumption that it is dealing with an authenticated device/subscriber pair. In a general case, the server 106, 110 may be a server that provides application services to the device/subscriber pair. For example, the application service may deliver Electronic Program Guide (EPG) data, a gaming service, Internet based video services, and so on. In one particular implementation, the servers 106, 110 may be a CAS/DRM server that provides conditional access services, such as providing rights and licenses to devices and providing content encryption keys to servers that stream encrypted content to authorized devices. In another implementation, the servers 106, 110 may be service providers for mobile/cellular telephone service.

Device 104 is generally indicative of a wide variety of network-enabled devices and is not intended to suggest any limitation as to the scope of use or functionality of the system (s) and methods described herein. For example, device 104 may be a consumer electronic device such as a mobile phone, a personal digital assistant, a personal computer, a personal media player, a computer/television device, a set-top box, a hard-drive storage device, a video camera, a DVD player or another type of known or later developed electronic device. Device 104 communicates with servers 106, 110 or operators 108, 112 over any applicable communications network (not shown). A communication network may be any suitable network such as, for example, a Wireless Wide Area Network (WWAN), WiMax, 3GPP, terrestrial or a satellite transmission network, and/or a landline transmission network, such as a Wide Area Network (WAN), DSL, fiber or cable network.

For an operator 112, 108 change to occur, the three parties need to be in agreement: the subscriber 102, the "old" operator, for example 108 and the "new" operator, for example, 112. Both the new and "old" operator need to make sure that the user has provided consent to the move, potentially without trusting each other. Thus authentication of user by one of the old or "new" operator may not provide enough evidence for the other operator that the user has provided consent. Thus both operators must independently ascertain that the user has provided consent. The subscriber credential used in the process may be a password or a PIN or anything that is accessible to a human user. For simplicity we use the term subscriber password (SPW) going forward.

There are several major options, depending on whether a trusted third party (e.g. subscription manager (SM)), as shown in FIG. 1B is involved or the operators trust each other or there is no inter-operator trust and no SM. Also another factor that plays a role is whether the user managing the device is using the device itself to provide consent, or if she is using a different device such as a PC, e.g. 117. We go through the impact of these factors on the solution below.

If the user is managing the device, using the device itself, the security and processing capability of the device must be taken into account in the solution. If, for instance, data is encrypted for the device, using device public key (D_PLK), the device must possess corresponding private key and the platform characteristics required to securely store the private key. Otherwise, we consider the encryption as optional. It is possible that device and server share symmetric keys for the purpose of signing or encrypting messages, but this is not a scalable solution, when dealing with large number of devices (see below).

If, on the other hand, the user is managing the device, using an auxiliary device, for example 117, it is the auxiliary device's identifier, public/private key is considered in the solution. There is also a third case, which may be quite common and that is when the user is an administrative manager, handling a large population of devices. In this case, the user will with high likelihood use a PC and thus, given the lack of security on a PC, may use a secure token, holding the admin public/private key pair, or a symmetric key that the server recognizes. In these case we, the identity, keys stored in the token are considered as (Device_ID, D_PLK, D_PVK) or D_SYM in the solution described below. It should be noted that in that case the device and D_PLK and D_PVK do not refer to the device for which subscription is being changed. In this case, the subscriber ID and password (SID and SPW) would also refer to credentials provided to the administrator, not individual device owners (sub-claim). To refer to the device that is involved in operator switch, we use Device_ID list (DIL), which could consist of a single id or a large ID, or a hash of device IDs, in case the list is previously known. The use of the hash is to avoid include large list of devices in small messages.

One of the aspects of this solution is creation of a user consent token (UCT) when the server successfully ascertains that the user has provided consent for an action. When a subscription manager (SM) exists, the abstraction provided by the SM is that the UCTSM issued by the SM is accepted by both operators involved, even though there may be other operators that do not trust this particular SM (irrelevant to operator switch at hand). If on the other SM does not exist and UCT is created by one operator may or may not be trusted by the other operator. In the latter case, the second operator may perform its own assertion of user consent. Regardless of the scenarios mentioned, from a device point of view, it is server that performs an authentication function with the user, using a server key pair (S_PLK, S_PVK) and a server certificate (S_Cert).

Although, the authentication signaling is started by the server, it is basically triggered by an action performed by the user. The user may contact the "new" operator (to which the user desires to switch) first or the "old" operator first. In those cases, depending on whether a trusted SM exists, each of those operators may trigger the SM to perform a user authentication to obtain user consent and issue a UCTSM that they both trust. Whichever operator is contacted first, that operator provides the subscriber ID associated with that operator (claim, option) to the SM (e.g. "new" operator provides SIDn and "old" operator provides SIDo). It is possible that the user contacts SM directly (claim, option), then the trigger to SM comes directly from user, providing one or both of SIDs as part of request.

When no SM exists and user requires UCT, the operator itself is the entity that is performing the authentication in the process below.

The SM may have, in secure storage, mapping between subscriber IDs and device IDs or device ID lists for each of the operators it is managing to be able to deduce say a subscriber ID related to an operator based on a ID in the device ID list.

User Consent Token Creation

Creation of a user consent token (UCT), utilizes a novel process referred to as "device assisted user consent (DAUC)." As mentioned above, the availability and true meaning of device public and private key (D_PLK, D_PVK) depends on a user interface scenario. Further, as explained above, either the SM or any of the operators may take the role of server in performing the authentication process, and thus, the SID used in the process may vary. To avoid confusion, the DAUC is described herein as a generic message exchange procedure between a user and an authenticating server. Variations in terms of parameters and entities exchanging the messages are covered in scenario descriptions that follow.

Figure 2A:
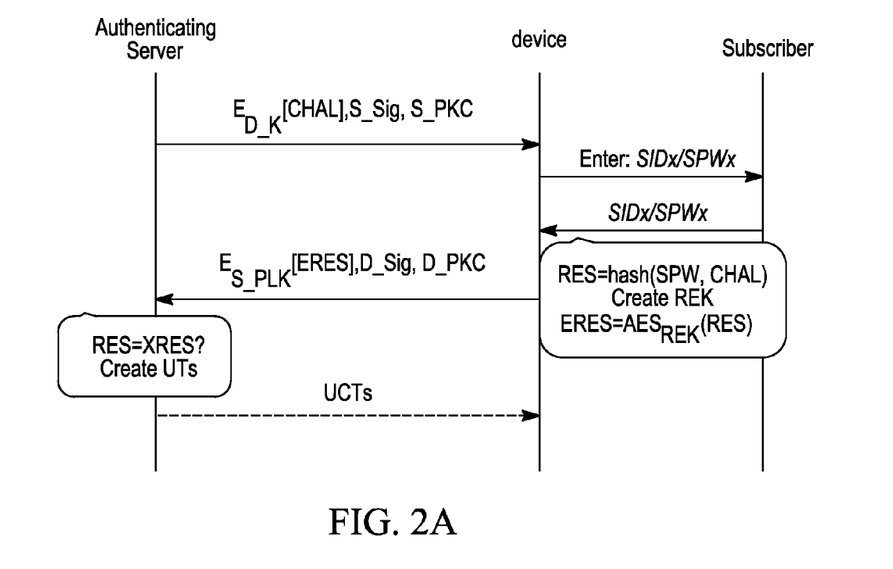
FIGS. 2A and 2B show one example of how DEAU is accomplished.
Figure 2B:
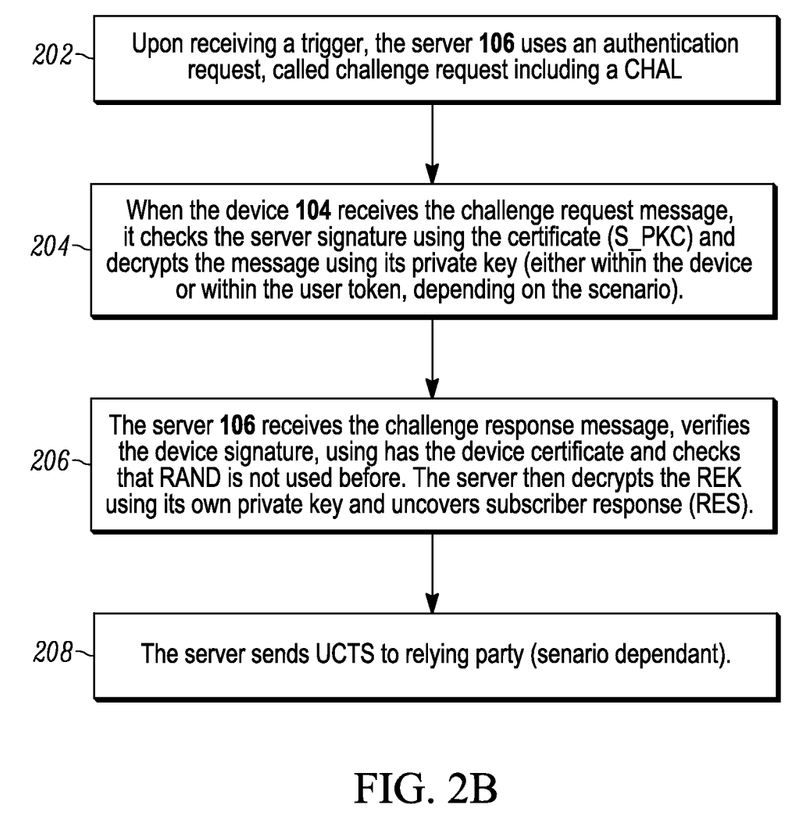

FIGS. 2A and 2B show how device-assisted user consent (DAUC) is accomplished. At block 202, upon receiving a trigger, the server issues an authentication request, called a challenge request including a CHAL, and optionally signs (to provide integrity protection) the contents with its S_PVK (and includes S_Cert). The server may encrypt the signed CHAL to provide protection against passive analysis (confidentiality protection). The server may also encrypt the CHAL, preferably before signing, using a key device holds. When managing a single device, this could be D_PLK, if available; otherwise, this could be a key inside administrator's token, as mentioned earlier. The CHAL should include a random value (RAND) or a nonce (e.g. time space) for anti-replay measures and a subscriber ID (SID) for which password is being requested along with OIDs for the operator (X) that issued the SID. Thus, depending on availability or scenario, other OIDs may also be included to require user to reply with the corresponding SID for that operator (this will be discussed for each scenario later). Thus CHAL and the message including CHAL may look as follows (fields inside brackets are optional).

CHAL=RAND, SIDx, OIDx, [OID_list], [DIL]

Challenge request payload=$E_{D\_K}$[CHAL], S_Sig, S_PKC

At block 204, when the device 104 receives the challenge request message, it checks the server signature using the certificate (S_PKC) and decrypts the message using its private key (either within the device or within the user token, depending on the scenario). The device may perform checks on RAND to ensure it was not used before and then extracts the SID and OID from the CHAL and prompts the subscriber to use his/her SID and password (SPW) corresponding to the OID. The device uses the SPW and creates a response (RES) as shown below. Creation of RES can use a pre-specified pseudo-random function (PRF), (e.g. HMAC_SHA-256) and any other info that is described as part of policy. The SPWx is the referred to PRF key, as it is the key used to provide entropy in RES generation. To protect the RES, the device could, for example, generate a random symmetric key (e.g. a 128 bit AES key) to encrypt the RES. This key can be referred to as RES encryption key (REK). The device then encrypts the RES with REK to arrive at the encrypted RES (ERES). Note that ERES may include some clear data (such as OID_list2 in some scenarios to provide additional information to the server in the clear). The optional DIL refers to the list of devices (or hash of the list) that is involved in the switch. The device then encrypts the REK with the operator's server's public key (S_PLK) received from the server certificate), and appends ERES and its own ID (device_ID), and then signs the entire message with device's private key (D_Prk). The device optionally adds its certificate (D_PKC) for the server and sends the result as a challenge response message back to the server.

RES=PRF(SIDx, SPWx, RAND, OIDx, [OID_list2], [DIL], other info), OID_list2 ERES=$E_{REK}$[RES]

Challenge response payload=($E_{S\_PLK}$(REK), ERES, device_ID, D_Sig, [D_PKC]

At block 206, the server 106 receives the challenge response message, verifies the device signature, using has the device certificate and checks that RAND has not been previously used. The server then decrypts the REK using its own private key and uncovers subscriber response (RES). If the RES is satisfactory, then the server issues a user consent token (UCTs) and signs it with its own private key. The token includes a number of items in the clear, including user consent time (UC_Time), the token signing time (UT_time) and any operator IDs and corresponding subscriber IDs relevant to the consent. The server includes its own certificate for receivers of token to readily verify the validity of the token.

UCTs=(SIDx, OIDx, RAND, [UC_Time], [UT_time], (SID_list, OID_list], [DIL] other info), S_sig, S_PKC Finally, at block 208, the server sends UCTs to the relying party (scenario dependent).

Implementations and Scenarios:

In the following implementations, the customization of parameters and message exchanges for each scenario is described. It shall be noted that each scenario can have two sub-scenarios: If the user is using the device for which the subscription is being changed for DAUC process, the "device" in the protocol description refers to this device. On the other hand, if the user is an administrator using an auxiliary device to manage a large population of devices, the "device ID" and public key pair in protocol description refers to the identifier and key pair of the auxiliary device. So the use of device ID and D public key pair and certificate in the protocol is the same in both sub-scenarios depends on the meaning of "device" in the sub-scenario. In the case of the administrator, device ID list (DIL) may refer to a list of devices being switched or a hash of device IDs.

Furthermore, regardless of the scenario, once the user consent is asserted by the use of user consent token (UCT) at the "new" operator and "old" operator, the "new" operator can ship the new subscription profile to the user's device either directly or through a SM 115.

In one implementation, the entity that is initially contacted by the user (proxy operator) or the SM is not the entity performing DAUC (possibly since SM does not have access to a password, or the SM does not exist). In those cases, SM or the proxy operator should redirect the user to the authenticating server based on the OID provided.

Implementation 1: User Contacts "New" Operator First, but Authenticates to SM

Figure 3A:
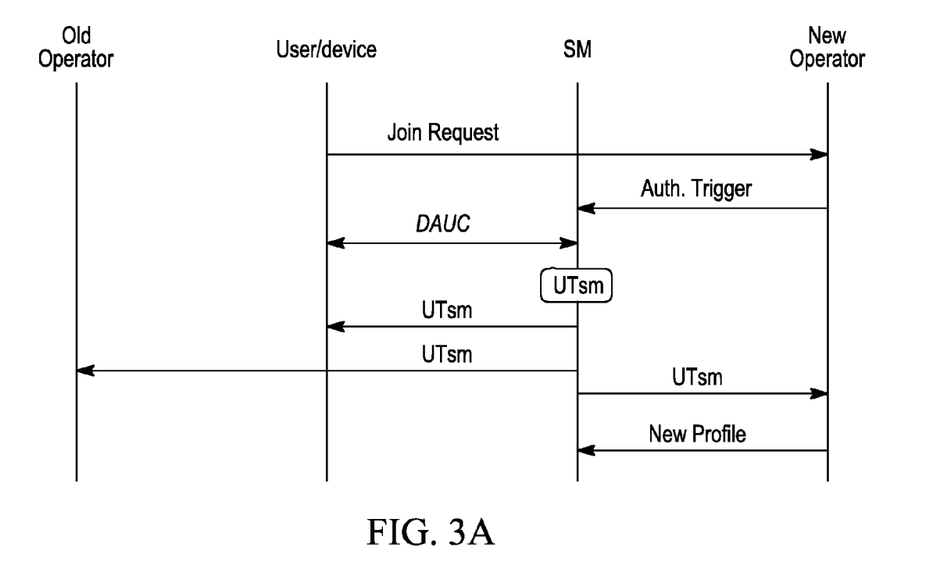
FIGS. 3A and 3B show one particular example of a method for performing authentication and authorization over a communication system.
Figure 3B:
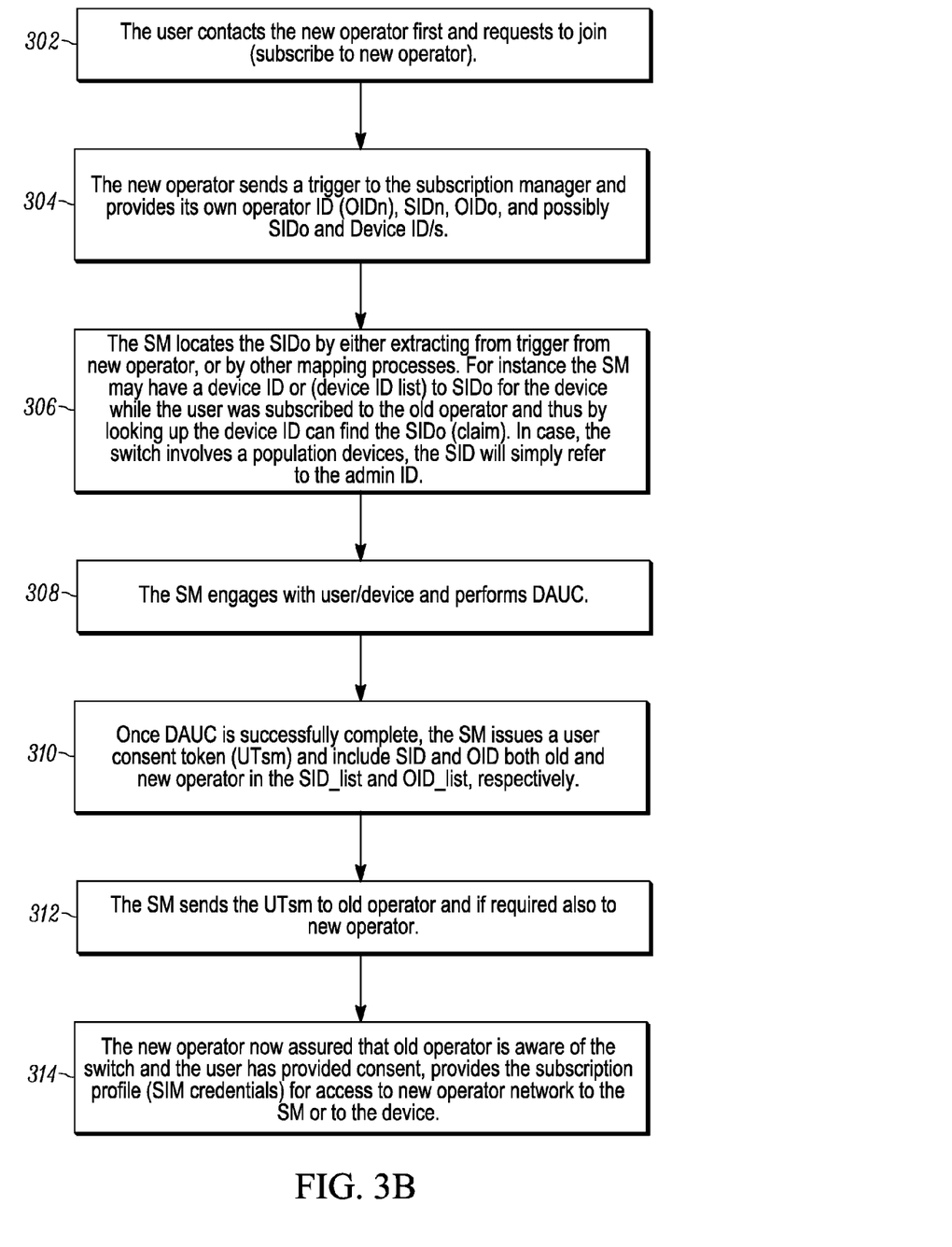

FIGS. 3A and 3B show one implementation of a situation when a user contacts the "new" operator first, but authenticates to the SM.

Beginning at block 302, the user contacts the "new" operator first and requests to join (subscribe to "new" operator).

The user gets a subscriber ID and subscriber password (SIDn, SPWn) from the operator. The user may also provide its "old" operator information (verbally or through the device providing the info). The "old" operator info could include OIDo and possibly SIDo, if there are no privacy issues or other information to help SM to locate subscriber information at "old" operator. One example of the information could be the device ID (if a single device is being used). If the operator switch is regarding a population of devices, the user may provide the device ID list as part of request. Note that the "new" operator at this point does have a user consent for joining "new" operator, but does not have proof from subscriber providing consent to the "old" operator.

At block 304, the "new" operator sends a trigger to the subscription manager and provides its own operator ID (OIDn), SIDn, OIDo and possibly SIDo and Device ID/s.

Advancing now to block 306, the SM locates the SIDo by either extracting a trigger from "new" operator, or by other mapping processes. For instance the SM may have a device ID or (device ID list) to SIDo for the device while the user was subscribed to the "old" operator and thus by looking up the device ID can find the SIDo. In case, the switch involves a population of devices, the SID will simply refers to the admin ID.

At block 308, the SM then engages with user/device and performs DAUC. In the DAUC, the X refers to "old" operator. Thus, SIDo and OIDo are sent to user as SIDx and OIDx and it is expected that the user uses its password with "old" operator (SPWo) as SPWx in calculation of RES. This will require the SM to have access to SPWo (to be received from the "old" operator as part of a request or initial subscriber registration). Alternatively, the user may have access to a set of credentials (SIDsm, SPWsm) from SM and use SPWsm as PRF key (SPWx) in DAUC calculation of RES. This is quite likely in the case where a user is an administrator and manages a large number of devices. For single devices, it might not be beneficial to require a user to establish a password with the SM and the "old" operator may not be willing to share the SPWo with SM and in that case the user's RES (after SM decryption) must be shipped to "old" operator for validation (not shown). If SPWsm is to be used as SPWx (SIDsm as SIDx), then SM includes OIDo and OIDn in OID_list and if SPWo is used as SPWx, then SM only includes OIDn in OID_list in challenge request. The device replies by including a pair of (OID, SID) in list2 of response for each OID included in the OID_list in challenge request. This is to ensure that the token includes information on both operators in the UTsm so that the users of token can verify which two operators are involved in the switch.

At block 310, once DAUC is successfully complete, the SM issues a user consent token (UCTsm) and includes the SID and OID of both the "old" and "new" operator in the SID_list and OID_list, respectively. The SM can sign the token with its own private key and include its own certificate.

At block 312, the SM sends the UCTs to the "old" operator and if required also to "new" operator.

At block 314, the "new" operator is now assured that the "old" operator is aware of the switch and the user has provided consent, provides the subscription profile (SIM credentials) for access to "new" operator network to the SM or to the device.

Implementation 2: User Contacts "Old" Operator First but Authenticates to SM

Figure 4A:
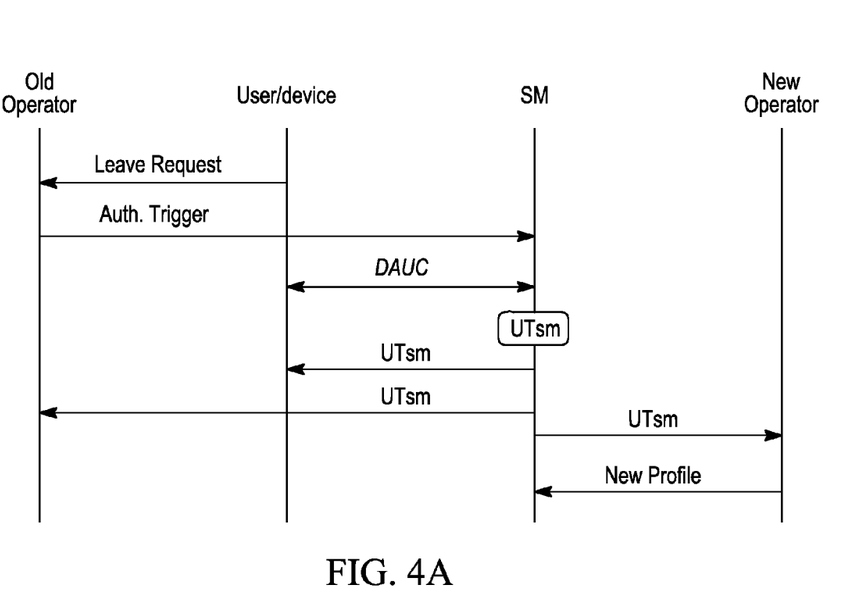
FIGS. 4A and 4B show one particular example of a method for performing authentication and authorization over a communication system.
Figure 4B:
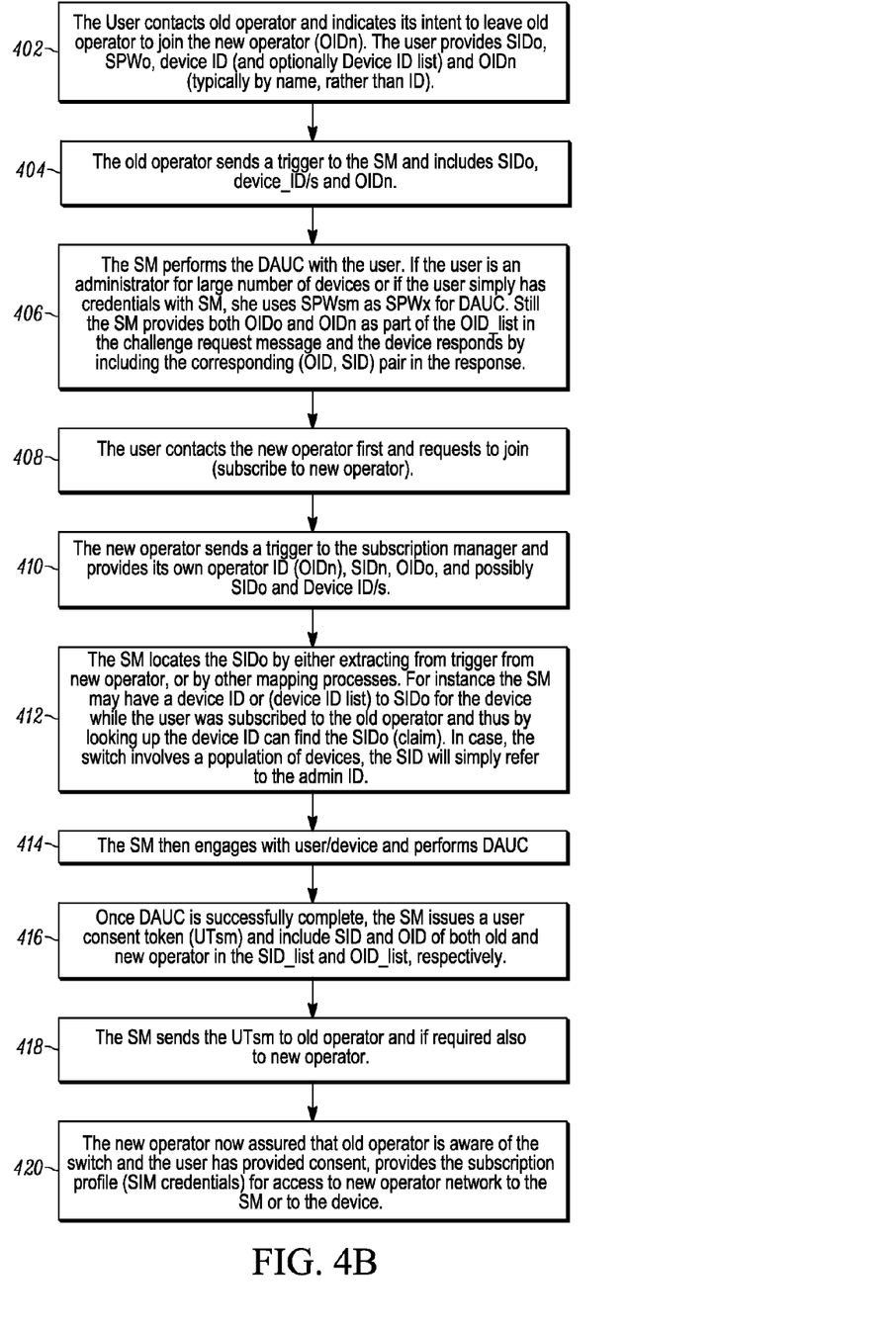

Another implementation is shown in FIGS. 4A and 4B. In a typical scenario, users are less likely to tell the "old" operator that they are leaving without considering other alternatives. To be able to use "new" operator credentials for DAUC, the user must have contacted "new" operator to obtain SIDn and SPWn ahead of time and out of band and now simply asks the "old" operator to assist in the move. This scenario of this implementation would be more likely if the SM were to use a set of credentials that the SM has issued for the user as part of the consent assertion. This is described below.

At block 402, the user contacts the "old" operator and indicates its intent to leave the "old" operator to join the "new" operator (OIDn). The user provides SIDo, SPWo, device ID (and optionally Device ID list) and OIDn (typically by name, rather than ID). The "old" operator can proceed with its own consent assertion mechanism based on the operator's policy.

At block 404, the "old" operator sends a trigger to the SM and includes SIDo, device_ID/s, and OIDn.

At block 406, the SM performs the DAUC with the user. If the user is an administrator for large number of devices or if the user simply has credentials with SM, she uses SPWsm as SPWx for DAUC. Still the SM provides both OIDo and OIDn as part of the OID_list in the challenge request message and the device responds by including the corresponding (OID, SID) pair in the response. If an SPWsm does not exist (user does not have account with SM), then the SM needs to use SPWn as SPWx (PRF key) to ensure user's consent for operator switch. In that case the SM needs to either act as proxy to relay the RES to "new" operator for validation or to obtain the (SIDn, SPWn) from the "new" operator through a secure channel. This is not shown in the figure. In either case, when SPWn is used as SPWx, the OID list in the challenge request from the SM need to include OIDo. The user responds by including (OIDo, SIDo) in list2 items the response.

Blocks 408 to 418 are as disclosed in the implementation described in FIG. 3.

Implementation 3: User Contacts SM Directly

Figure 5:
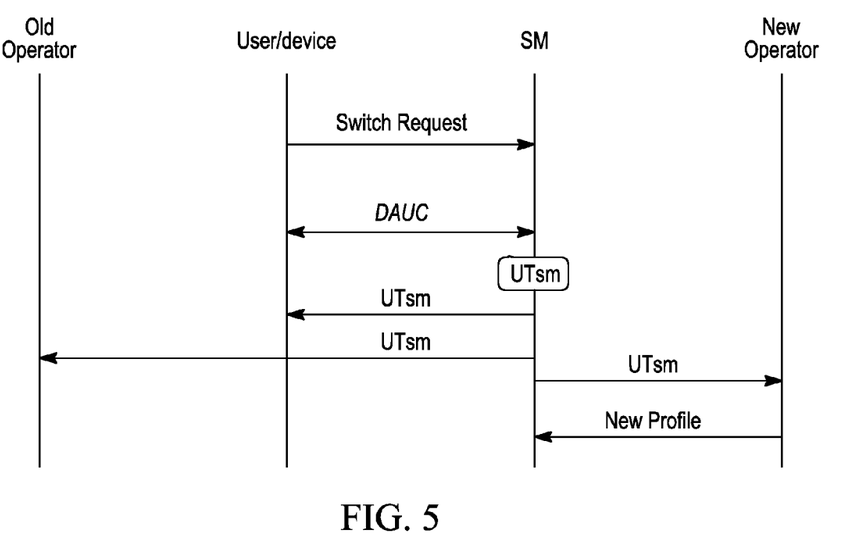
FIG. 5 shows one particular example of a method for performing authentication and authorization over a communication system.

One implementation of a scenario in which the user contacts the SM directly is shown in FIG. 5A. In one implementation, the user manages a large population of devices and thus has accounts and credentials with the SM. In this scenario, the SM receives the trigger directly from the user's request (rather than from one of the operators). The user provides OIDn and OIDo along with the respective SIDs as well as device ID (and optionally device ID list for devices that are affected in the switch) in the trigger. The DAUC uses SPWsm as SPWx and SIDx is the same as user's SID with the SM (SIDsm). The OID list from SM includes OID for both operators. The remaining steps are similar to prior implementations, for example, the implementation shown in FIGS. 3A and 3B.

Implementation 4: No SM Involved, User Contacts "New" Operator

Figure 6:
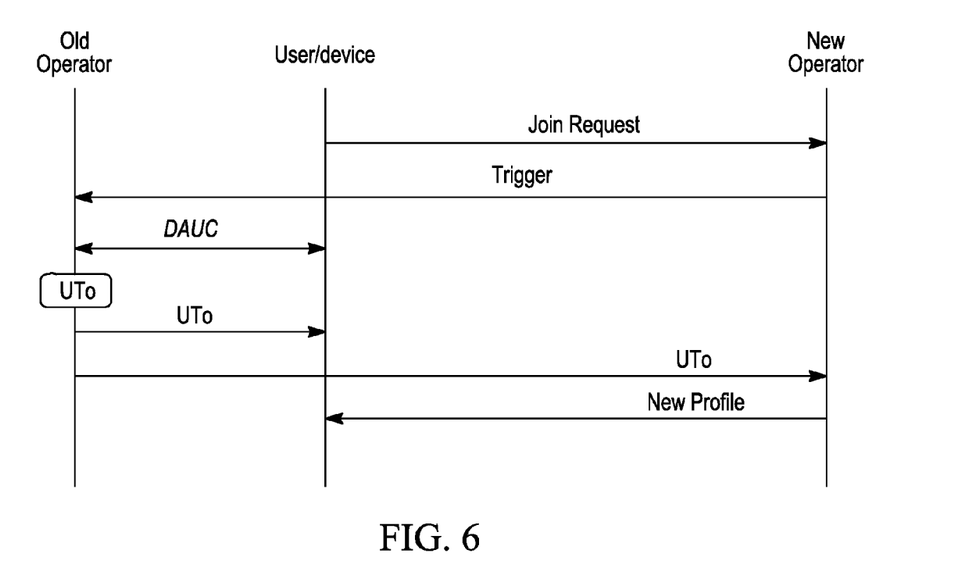
FIG. 6 shows one particular example of a method for performing authentication and authorization over a communication system.

In yet another implementation, shown in FIG. 6, the user contacts the SM directly. This is similar to scenarios that are common in business, where no subscription manager (SM) is involved. In such an implementation, the user contacts the "new" operator and indicates intent to join, and this action is accepted as user consent for the "new" operator. The user provides OIDo and possibly SIDo (or Device_ID or device ID list). The "new" operator sends a trigger to the "old" operator and indicates it needs a user consent token from "old" operator (to confirm "old" operator's knowledge of the switch). The "new" operator redirects user's request to the "old" operator. The "old" operator (after possibly matching Device_ID (or device ID list) to a subscriber to find SIDo, in case it was not provided) engages in DAUC with the user by using (SIDo, SPWo) as (SIDx,SPWx) in the process and OIDn as OID list in the challenge request. The user can reply by including (SIDn, OIDn) in the respective list2 in the response.

The "old" operator issues the token (UTo) as described in DAUC section and sends it to the "new" operator.

Implementation 5: No SM, User Contacts "Old" Operator for the Switch

Figure 7:
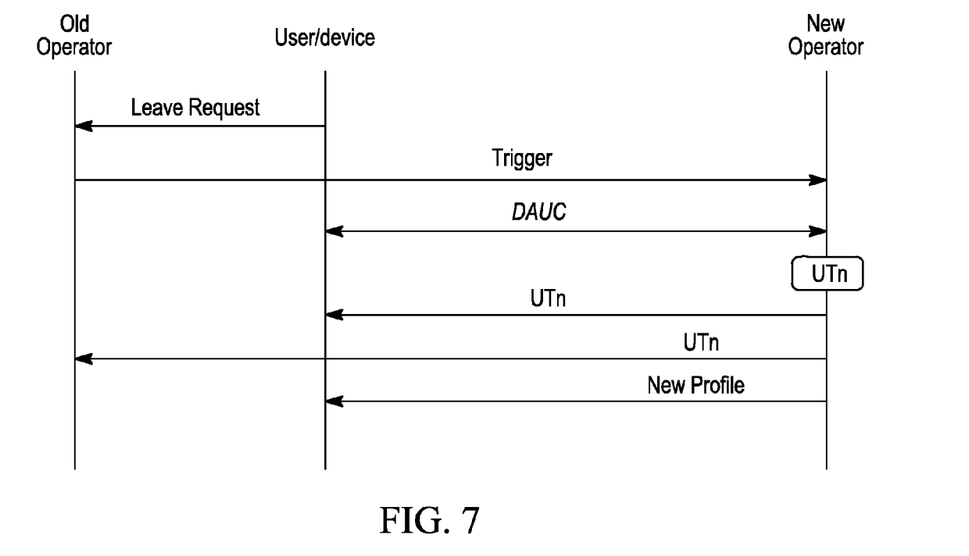
FIG. 7 shows one particular example of a method for performing authentication and authorization over a communication system.

FIG. 7 depicts an implementation in which the user contacts the "old" operator. In such an implementation, if this happens, the user must have obtained SIDn and SPWn previously and out of band. The "old" operator receives OIDn and possibly SIDn (or device_ID or device ID list) from the user and sends a trigger to the "new" operator. The "new" operator, after finding SIDn (if not available, process moves to a process similar to Implementation 4, above), engages in DAUC with the user by using (SIDn,SPWn) as (SIDx, SPWx) and OIDo as OID list. After the DAUC is complete and the UTn is issued, it is sent to the "old" operator.

The scenario of the two operators not being able to trust each other regarding the subscriber's will is resolved by obtaining the user consent twice, while performing delay optimizations and security enhancements. Weak subscriber credentials can protected from eavesdropping and attacks (such as dictionary attacks) by a simple single message without the need for lengthy TLS-style exchanges and using less powerful devices. In this manner, large population of devices can be managed. Furthermore, the use of subscription manager as a trusted third party simplifies many trust issues and the overall process. This solution will be used for well-used standards (GSMA, ETSI SCP and 3GPP).

Also this solution is important for M2M devices that are either too weak to perform complicated crypto or should be handled in large quantities, so a single administrator can perform operator switches for a large number of M2M devices using her PC. This solution can be used in ETSI M2M and many other M2M applications.

Aside from operator switch, this may be applicable in roaming scenarios or a scenario when user consent is to be provided to allow two authorities to interact regarding user's interest (e.g. exchange of medical information).

Figure 8:
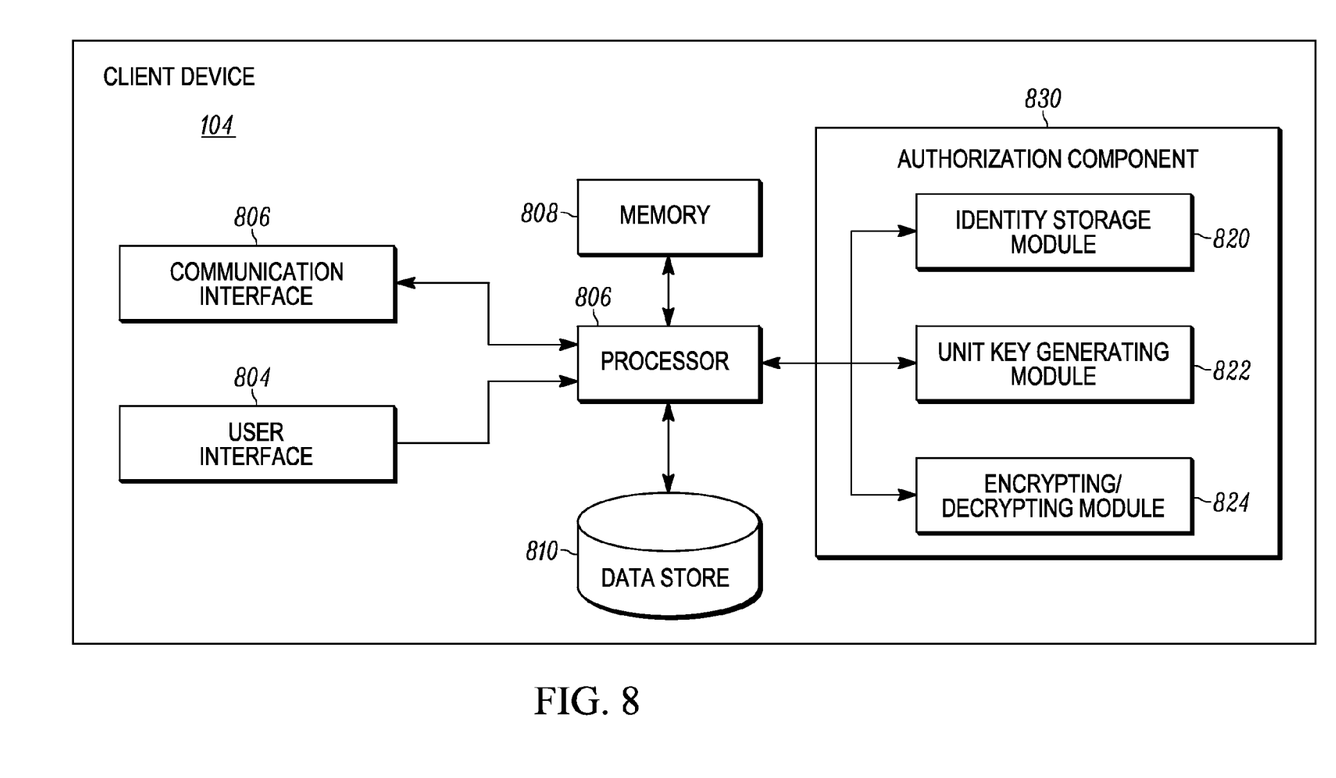
FIG. 8 shows one example of the pertinent components of a network-enabled device.

FIG. 8 shows one example of the pertinent components of a network-enabled device such as device 104 or 117 shown in FIGS. 1A and 1B. It should be apparent to those of ordinary skill in the art that FIG. 8 is a block diagram that represents a generalized illustration and that other components may be added or existing components may be removed, modified or rearranged. The client device 104 includes a processor 802, a user interface 804, a communication interface 806, a memory 808, a data store 810 and an authorization component 830.

The authorization component 830 performs the functionality used during the authorization and authentication process and may include, for example, such sub-components or modules as an identity storage module 820 to store cryptographic keys and digital certificates, a key generating module 822 to generate the various sets of keying material used during the process and an encryption/decryption module 824.

The modules 820-824 may comprise software modules, hardware modules, or a combination of software and hardware modules. Thus, in one implementation, one or more of the modules 820-824 comprise circuit components. In another implementation, one or more of the modules 820-824 comprise software code stored on a computer readable storage medium, which are executable by one of the processors 802. In a further implementation, the modules 820-824 may comprise a combination of hardware and software. In some cases the modules 820-824 may be implemented as one more secure hardware modules that are not susceptible to tampering. In any regard, the functionalities of one or more of the modules 820-824 may be combined into a lesser number of modules 820-824 or separated into additional modules without departing from a scope of the invention.

The user interface 804 may comprise a set of keys, buttons, switches, audio transducers, displays and the like through which a user may enter inputs into the client device 840. The communication interface 806 may comprise suitable hardware and/or software to enable the client device 840 to communicate over the content delivery system.

The memory 808 and the data store 810 may comprise any reasonably suitable computer readable storage media, such as, RAM, ROM, EPROM, EEPROM, magnetic or optical disks or tapes, etc. The memory 808 may store respective programs or algorithms that define the functionalities of the processor 802. In this regard, in instances where the modules 820-824 comprise software modules, the modules 820-824 may respectively be stored as software on the memories 808. The data store 810 may store various information that the processor 802 may need in addition to the various keys available in the storage module 820.

Although various implementations are specifically illustrated and described herein, it will be appreciated that modifications and variations of the present invention are covered by the above teachings and are within the purview of the appended claims without departing from the spirit and intended scope of the invention. For example, while the invention has been described in the context of a conditional access system, which protects content by requiring certain criteria to be met before granting access to content, the invention is also applicable to copy protection schemes, which prevents the unauthorized reproduction of content.

Although described specifically throughout the entirety of the instant disclosure, representative examples have utility over a wide range of applications, and the above discussion is not intended and should not be construed to be limiting. The terms, descriptions and figures used herein are set forth by way of illustration only and are not meant as limitations. Those skilled in the art recognize that many variations are possible within the spirit and scope of the examples. While the examples have been described with reference to examples, those skilled in the art are able to make various modifications to the described examples without departing from the scope of the examples as described in the following claims, and their equivalents.

What is claimed is:

1. A method of confirming a request to change a provider of a service for an electronic device, the method comprising, by a third party manager device:

receiving from a requesting entity a request for a record of a subscriber's consent to switch receipt of a service from a first operator to a second operator;

in response to the request, sending an electronic device of the subscriber a challenge to provide an authentication credential, wherein the challenge comprises an identifier of the subscriber, an identifier of the first operator, an identifier of the second operator, or identifiers of both the first and second operator;

receiving a challenge response from the subscriber's electronic device, wherein the challenge response comprises the identifier of the subscriber, the requested authentication credential, the identifier of the first operator, the identifier of the second operator, and an identifier of the subscriber's electronic device;

verifying the authentication credential;

creating a user consent token that comprises the identifier of the subscriber, the identifier of the first operator, the identifier of the second operator, the identifier of the subscriber's electronic device, and a certificate for receivers of the token to verify validity of the token; and sending the user consent token to the requesting entity.

2. The method of claim 1, wherein the requesting entity is the subscriber.

3. The method of claim 1, wherein the requesting entity is the first operator or the second operator.

4. The method of claim 1, further comprising generating the challenge to comprise a random value or nonce for anti-replay measures.

5. The method of claim 4, wherein generating the challenge further comprises encrypting the challenge as an encrypted challenge message.

6. The method of claim 1, wherein creating the user consent token also comprises including in the token a user consent time.

7. The method of claim 1, wherein:

the service comprises a mobile telephone service; and the first operator and the second operator are each providers of mobile telephone services.

8. The method of claim 1, wherein sending the user consent token to the requesting entity comprises sending the user consent token to both the first operator and the second operator.

9. The method of claim 1, further comprising verifying that the challenge response includes both the identifier of the first operator and the identifier of the second operator.

10. A system for confirming a request to change a provider of a service for an electronic device, the system comprising:

a third party manager device comprising a processor and a non-transitory memory containing programming instructions that are configured to, when executed, instruct the processor to:

receive from a requesting entity a request for a record of a subscriber's consent to switch receipt of a service from a first operator to a second operator;

in response to the request, send an electronic device of the subscriber a challenge to provide an authentication credential, wherein the challenge comprises an identifier of the subscriber, an identifier of the first operator, an identifier of the second operator, or identifiers of both the first and second operator;

receive a challenge response from the subscriber's electronic device, wherein the challenge response comprises the identifier of the subscriber, the requested authentication credential, the identifier of the first operator, the identifier of the second operator, and an identifier of the subscriber's electronic device;

verify the authentication credential;

create a user consent token that comprises the identifier of the subscriber, the identifier of the first operator, the identifier of the second operator, the identifier of the subscriber's electronic device, and a certificate for receivers of the token to verify validity of the token; and send the user consent token to the requesting entity.

11. The system of claim 10, wherein the requesting entity is the subscriber.

12. The system of claim 10, wherein the requesting entity is the first operator or the second operator.

13. The system of claim 10, wherein the instructions to generate the challenge further comprise instructions to include in the challenge a random value or nonce for anti-replay measures.

14. The system of claim 13, wherein the instructions to generate the challenge further comprise instructions to encrypt the challenge as an encrypted challenge message.

15. The system of claim 10, wherein the instructions to create the user consent token also comprise instructions to include in the token a user consent time.

16. The system of claim 10, wherein:

the service comprises a mobile telephone service; and the first operator and the second operator are each providers of mobile telephone services.

17. The system of claim 10, wherein the instructions to send the user consent token to the requesting entity comprise instructions to send the user consent token to both the first operator and the second operator.

18. The system of claim 10, further comprising instructions to verify that the challenge response includes both the identifier of the first operator and the identifier of the second operator.

\* \* \* \* \*